United States Patent [19]

Doheny, Jr. et al.

[11] Patent Number: 4,961,978
[45] Date of Patent: Oct. 9, 1990

[54] NOVEL CLOSURE DEVICE FOR SHRINKWRAPS

[75] Inventors: Anthony J. Doheny, Jr., Natick; James R. Noonan, Watertown, both of Mass.

[73] Assignee: The Kendall Company, Boston, Mass.

[21] Appl. No.: 318,863

[22] Filed: Mar. 6, 1989

[51] Int. Cl.$^5$ .......................... B32B 3/08; B32B 7/06
[52] U.S. Cl. ........................ 428/40; 428/78; 428/189; 428/349; 428/354; 428/913
[58] Field of Search ............. 428/347, 349, 343, 40, 428/78, 334, 189, 354, 913; 522/161

[56] References Cited

U.S. PATENT DOCUMENTS

| | | | |
|---|---|---|---|
| 3,144,398 | 8/1964 | Rainer et al. | 522/161 |
| 3,455,337 | 7/1969 | Cook | 522/161 X |
| 3,886,056 | 5/1975 | Kitamaru et al. | 522/912 X |
| 3,949,110 | 4/1976 | Nakajima et al. | 522/153 X |
| 3,988,399 | 10/1976 | Evans | 264/327 X |
| 4,181,775 | 1/1980 | Corke | 428/355 X |
| 4,348,438 | 9/1982 | Canterino | 522/161 X |
| 4,356,222 | 10/1982 | Harakawa | 428/78 |
| 4,469,742 | 9/1984 | Oberle et al. | 428/520 X |
| 4,517,234 | 5/1985 | Fisher | 428/192 X |
| 4,521,470 | 6/1985 | Overbergh et al. | 428/212 X |
| 4,590,020 | 5/1986 | Itaba et al. | 522/161 X |
| 4,596,732 | 6/1986 | Diaz | 428/347 X |
| 4,767,653 | 8/1988 | Renstrom | 428/347 X |

*Primary Examiner*—George F. Lesmes
*Assistant Examiner*—J. Davis
*Attorney, Agent, or Firm*—Alvin Isaacs

[57] ABSTRACT

A closure device for shrinkwraps comprising a high temperature-resistant, flame-resistant and dimensionally stable backing layer, a cross linked, high temperature-resistant, shear-resistant, and flame-resistant pressure sensitive adhesive applied to one surface of the backing layer; a heat-shrinkable film dimensionally smaller than the pressure sensitive adhesive layer positioned on the adhesive layer so as to maintain a peripheral area of exposed pressure sensitive adhesive; and an optional release liner applied so as to protect the exposed pressure sensitive adhesive layer from premature and unwanted contact prior to use.

9 Claims, 1 Drawing Sheet

NOVEL CLOSURE DEVICE FOR SHRINKWRAPS

BACKGROUND OF THE INVENTION

It is well known in the art to provide protective wraps for protecting tubular articles such as pipelines and the like. Such protection is necessitated by both external and internal degradative forces exerted on in-ground pipelines. External forces are exerted by the environment and manifest themselves in soil stresses, sedimentation, water accumulation, bacteria accumulation, etc.; all assisting in destroying the integrity of in-ground pipelines and the like. Internal forces are primarily stresses due to the segmented nature in which pipelines are laid in the ground.

As is common in the art, a pipeline consists of a series of individual pipe sections in which adjacent pipe sections are welded together to form what are referred to simply as pipe joints. After joining, the pipe joints are typically protected from the aforementioned degradative forces by an adhesive layer and an outer liquid-impermeable wrap.

A particularly efficacious outer wrap comprises a so-called shrink sleeve or heat-shrinkable film which is applied over the pipe joint and then heated to cause shrinkage of the film so that it and the underlyiny adhesive layer adhere tightly to the pipe joint.

The adhesive may be contained initially on the heat-shrinkable film backing to form a heat-shrinkable adhesive tape. Alternatively, and in lieu of having the adhesive on heat-shrinkable backing material, it is also known to first apply a coating of adhesive to the pipes surface and thereafter apply a heat-shrinkable film thereover.

While not intended to be construed to be a comprehensive survey of the art, the following patents are nevertheless considered to be illustrative of heat-shrinkable films.

U.S. Pat. No. 3,144,398 relates to the preparation of irradiated polyethylene which can be readily changed from a stretched to a shrunken condition. The objectives are said to be accomplished by cold stretching the polyethylene at a temperature of 65° C., and then irradiating at a specified dosage, preferably with electrons.

U.S. Pat. No. 3,144,399 relates to an irradiated, biaxially oriented polyethylene stretched at least 100% in each direction and below the break limit. The polyethylene is first irradiated at a specified dosage, then heated to or beyond its transparent point, and stretched to orient. The stretched condition is maintained while cooling to room temperature.

U.S. Pat. No. 3,455,337 relates to a differentially irradiated crosslinked polymeric recoverable article, tubing being particularly disclosed, characterized by containing a sufficient crosslink density near one surface to be substantially infusible and containing a gradual decreasing density of cross-linking throughout its thickness, the opposed surface being substantially non-crosslinked. As is described therein, the article is formed by first subjecting it to a dosage of irradiation insufficient to render the opposed surface infusible. Once the tubing has been differentially crosslinked, it is heated and subjected to differential pressure between the inside and the outside, the pressure being sufficient to cause the tube to expand in a controlled fashion.

U.S. Pat. No. 3,886,056 has for its objective to prepare from polyethylene having a high crystallinity a polyethylene having highly raised melting and softening temperatures, improved transparency and excellent dimensional stability at high temperatures. This objective is said to be accomplished by irradiating with a dosage of 0.2-16 Megarads to produce a crosslinked polyethylene having a gel content of at least one weight percent; extending the crosslinked polymer in at least one direction at a temperature of at least the anisotropic melting point; and then cooling.

U.S. Pat. No. 3,949,110 discloses a method of making a heat shrinkable tubing including the steps of irradiating the tube, heating to at least the softening temperature, partially inflating, and then thermosetting by cooling.

U.S. Pat. No. 3,988,399 relates to heat recoverable wraparound sleeves for pipejoints, cables, wire splices and the like which possess the ability to curl in involute fashion upon the application of heat. As is disclosed, for example, in Col. 6, one or both of the primary exterior faces can be coated with a suitable adhesive.

U.S. Pat. No. 4,348,438 discloses a process for preparing shrink wraps from a homopolymer of ethylene or a copolymer of ethylene with up to 20 weight percent of one or more other monomers. As disclosed, the film is uniaxially cold-oriented at a temperature of at least 5° C. below the film's melting point, irradiated with ionizing radiation and sealed along a seam running perpendicular to the direction of orientation. The irradiation, which is preferably carried out before the orientation, is at a dosage of 1–20 Megarads, about 3 to 5 Megarads being stated to be preferred.

U.S. Pat. No. 4,469,742 relates to a multilayer cook-in shrink film comprising: (1) a specified sealing layer; (2) a shrink layer; (3) a specified adhesive layer; (4) a barrier layer; (5) another adhesive layer; and (6) and a base layer, the respective layers being melt bonded and irradiated to crosslink sufficient to resist delamination during use.

U.S. Pat. No. 4,517,234 relates to a flat length of heat recoverable material having integral latching means so that the material can be wrapped around cable, pipe, etc., latched and then shrunk.

U.S. Pat. No. 4,521,470 relates to a system for enclosing an object by installing consecutively or as a single article: (a) a heat-softenable adhesive; (b) a specified thermoplastic polymeric material; and (c) a heat-recoverable cover, and thereafter heating to cause recovery (shrink).

U.S. Pat. No. 4,590,020 teaches an oriented high density polyethylene film having maximum crosslinking at the surfaces and minimum crosslinking inwardly. The film is prepared by crosslinking opposed surfaces by irradiation with electron rays in such a manner that the degree of crosslinking decreases from the surfaces inwardly so that the outer layer portions have gel fraction between 0–5%; and thereafter heating and stretching to orient and produce a film between 10–50 microns. As stated in Col. 3, both sides should be irradiated with the same dosage, the penetrating power of the electron rays being properly adjusted according to the thickness by changing the applied voltage or by using a shield.

My copending applications Ser. No. 003,091 filed Jan. 14, 1987 and 1770,177 filed Mar. 18, 1988 also relate to heat shrinkable films and tapes which may be employed as pipewraps, e.g. for protecting joints of pipelines. The disclosures of these copending applications which are not necessary for a clear understanding of the present invention, are incorporated by reference herein.

After the shrink sleeve is positioned over the pipejoint, means must be provided to retain it in place on the underlying pipe surface prior to heating. Various means for joining the open longitudinal seam of a heat-recoverable shrink-wrap during installation of tubular articles such as pipes are also well known in the art. The task to be met by such closures is primarily to maintain the seam against the internal shrinkage forces of the sleeve during its heat recovery when heat fused to the underlying surface such as pipe coating.

First among the known closure techniques are mechanical closures such as metal slip-on channels, disclosed in U.S. Pat. No. 3,455,335; buttons, as disclosed in U.S. Pat. No. 3,379,218; threaded loops, as disclosed in U.S. Pat. No. 3,530,383; and embedded inserts, as disclosed in U.S. Pat. No. 3,542,077. While mechanical closures have found commercial application, they do possess disadvantages. Among the disadvantages is the expense involved in manufacturing metal closures and in applying such closures to large diameter objects often, as with pipelines, in field stations. Thermal stresses which may be generated during the heat-recovery stage, are also disadvantageous.

While presently known film adhesive closures eliminate disadvantages exhibited by mechanical closures, they are subject to their own disadvantages. Exemplary of adhesive closure materials are the cyano acrylates as disclosed in U.S. Pat. No. 3,959,052, silicone adhesives, as disclosed in U.S. Pat. No. 4,153,747; chloroprene-based contact adhesives, as disclosed in U.S. Pat. No. 3,770,556, and crosslinked hot-melt adhesives as described in U.S. Pat. No. 4,220,676.

While hot melt adhesive closure systems are in commerce they are problematic since a cool portion must be maintained along the longitudinal axis of the sleeve to prevent the forces of contraction during application of heat from shearing the hot melt adhesive under the closure and thereby opening the closure. In other words, since hot melt adhesive closures have a lower melting point than the shrinking point of the polyolefin sleeve, the portion lying directly under the hot melt patch cannot be shrunk without liquidifying the hot melt adhesive and causing the polyolefin sleeve to pull apart from the hot melt patch thereby destroying the closure.

Pressure sensitive adhesives have been disclosed in U.S. Pat. No. 4,153,747 and 4,268,559. The pressure sensitive adhesive closures are either crosslinked or non-crosslinked. The disadvantage encountered with the crosslinked pressure sensitive adhesive closures again is liquification of the adhesive resulting in the pulling apart of the underlying polyolefin sleeve and thereby destroying the closure. This problem is partially overcome by using partially oriented sleeves, sleeves wherein the edges are unstretched. The inherent disadvantage of such a system lies in the necessity to manufacture different size sleeves to accommodate the varying pipe diameter sizes.

Crosslinked pressure sensitive adhesive closures provide a better bond between the closure and the sleeve because the crosslinking allows for shear strength at high temperatures. However, while the problem is solved in the overlying layers, the problem is not addressed in the bond between the substrate and the sleeve. The sleeves are still applied with a mastic or a hot melt adhesive. Consequently upon heating, the underlying bond is destroyed. Exemplary of problems encountered by crosslinked pressure sensitive adhesives, is U.S. Pat. No. 4,731,274 of Bonk et al disclosing a closure which employes two adhesives. Namely, one adhesive secures attachment of the closure to the substrate, a heat-activatable adhesive, and a second adhesive serves as a closing means for the closure device itself, a pressure sensitive adhesive. Since the two adhesives have different melting points, upon the application of heat, the heat-activatable adhesive will become liquified and sever the attachment between the closure and the substrate.

Alternatively, Bonk et al, suggests separating the pressure sensitive adhesive from the heat-activatable adhesive by graft-polymerizing the entire polyolefin sheet so as to allow for the attachment of a separate closure means over the sleeve lap. Notably, graft-polymerization of the entire sleeve, is a very costly and labor intensive process.

Lastly, and in general pressure sensitive adhesives are more permeable to oxygen and water than hot melt adhesives or polyolefins, a disadvantage which is very detrimental when applied to in-ground pipes whose integrity depends on the inhibition of degradative environmental forces.

The fourth known closure mechanism is a "Canusa wrapid" sleeve and involves a single unit sleeve. This sleeve has an adhesive free area which allows for direct fusion between the substrate pipewrap and the sleeve. The problem encountered by this closure system again is the necessity for having a large inventory to accommodate the varying pipe diameter sizes.

The task of the present invention, given the aforementioned disadvantages, simply stated, is to provide a novel closure to cover the lap of a heat-shrinkable film or tape such as are heretofore known in the art, which closure resists the shrink forces of the wrap, thereby allowing for tight closure and consequently offer protection against corrosion caused by the external and internal forces previously described.

BRIEF DESCRIPTION OF THE INVENTION

In accordance with the present invention, this task is accomplished in an efficient and elegant manner by providing a closure comprising a high temperature-resistant, flame-resistant and dimensionally stable backing layer, a crosslinked, high temperature resistant, shear resistant, flame resistant pressure sensitive adhesive applied to one surface of said backing layer; a heat-shrinkable film dimensionally smaller than said pressure sensitive adhesive layer and applied to said exposed pressure sensitive adhesive layer so as to maintain a peripheral area of exposed pressure sensitive adhesive; and an optional release liner applied so as to protect the exposed pressure-sensitive adhesive layer from premature and unwanted contact prior to use.

DETAILED DESCRIPTION OF THE INVENTION

As previously mentioned, pipewraps are known in the art to prevent degradative forces from attacking in-ground pipelines.

In order to prevent corrosion and/or other degradative forces from attacking pipelines, it is common practice to apply a protective cover to the surface of the pipe. While in its simplest form, this protective cover could be an anticorrision coating, for optimum longevity, especially for inground pipelines, the protective system will at least consist of an outer film or adhesive tape which is typically spirally wound around the pipe. For reasons which will be apparent, such an outer wrap is generally referred to in the pipeline protection art as a "pipewrap".

In a typical anticorrosion system currently in use, a primer coating is first applied to the surface of the pipe and over this primer coating a pressure-sensitive tape having a tough, abrasion-resistant backing is then wound. In this typical pipeline laying system, sections of pipe of predetermined length, e.g. on the order of 40 feet, and having a pipewrap of the foregoing general description are assembled in the field for inground implantation.

If the end sections to be abutted and joined are so wrapped, these end sections are stripped of the protective wrap and then welded together. A protective wrap is then placed over this pipe joint and adjacent portions of the respective pipewraps in order to secure the weld or pipejoint, which can be said to be the weakest link in the pipeline and hence requires the most protection from environmental forces and stresses.

According to the present invention, the novel closure system for retaining the shrinkwrap prior to heating to shrink, comprises a high temperature-resistant, flame-resistant and dimensionally stable backing layer, a crosslinked, high temperature-resistant, shear resistant, flame-resistant pressure sensitive adhesive applied to one surface of said backing layer; a heat shrinkable film dimensionally smaller than said pressure sensitive adhesive layer applied to said exposed pressure sensitive adhesive layer so as to maintain a peripheral area of exposed pressure sensitive adhesive; and an optional release liner applied so as to protect the exposed pressure sensitive adhesive layer.

Figure 1:
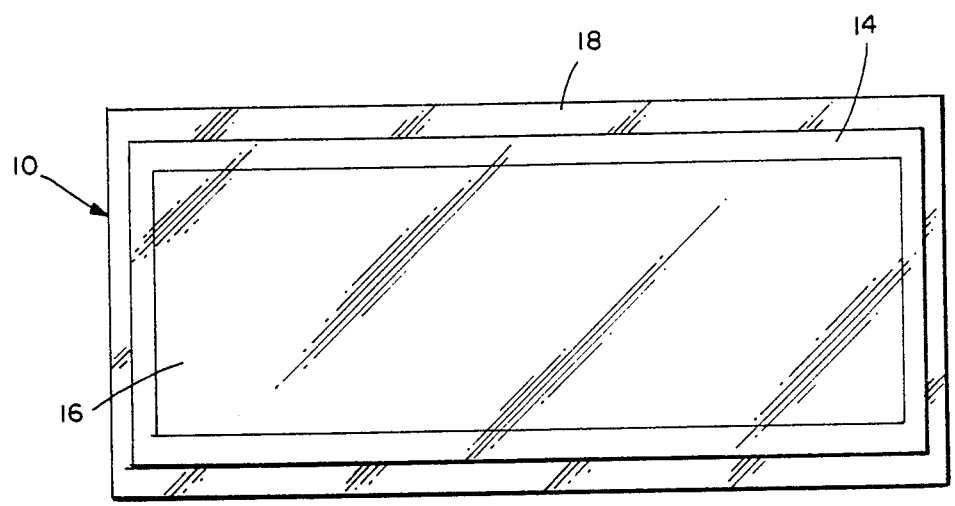
FIG. 1 is a rear view of the novel closure device of this invention.
Figure 2:
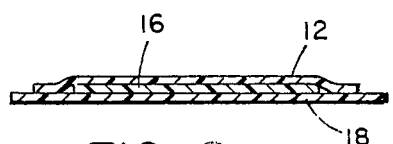
FIG. 2 is a cross-sectional view of the closure device of FIG. 1.

The novel closure system of the present invention may best be understood by referring to the illustrative drawings. Referring to FIGS. 1 and 2, the closure system 10 comprises a backing layer 12, of high temperature-resistant, flame-resistant and dimensionally stable film, containing on one surface thereof a crosslinked, high temperature resistant, shear resistant, flame resistant pressure sensitive adhesive 14. A heat shrinkable film, 16, of smaller dimension than layer 12, is then substantially centrally disposed on the adhesive layer to provide adhesive free surface areas for applying the closure system 10. Optionally a release sheet 18, dimensionally larger than the layer 12, may be applied to cover the exposed adhesive containing areas for easy application.

Figure 3:
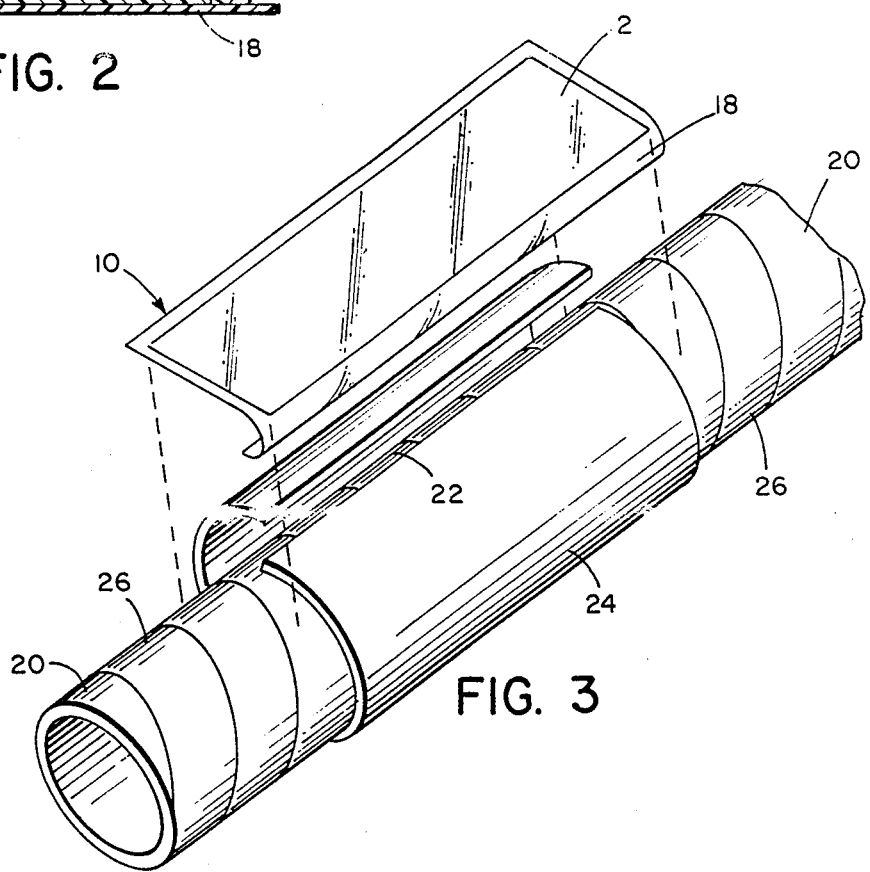
FIG. 3 is a perspective view illustrating the use of the closure device in holding a shrinkwrap in place over a pipejoint prior to heating to effect fusion and thereby securing the shrinkwrap to the pipe.

FIG. 3 illustrates the use of the novel closure system of this invention to a shrink sleeve applied over the pipejoint of two adjacent pipes.

As shown therein, two pipe sections 20 welded together to form a pipe joint shown generally as 22 have a heatshrinkable film 24 positioned over the pipejoint. For purposes of this invention, it will be appreciated that the particular heatshrinkable film or tape 24 which is employed is immaterial. It may be any of those per se known in the art, e.g. those disclosed in the aforementioned patents or applicant's previously mentioned copending applications.

In practice, the release liner 18 is first removed, and the closure is then applied to the overlap of the shrinkwrap, as shown by the dotted lines, to hold the shrinkwrap securely in place in preparation for the heating step.

The particular materials which may be selected in the practice of the present invention for film 16, may be of any of the heretofore known in the art for preparing heat-shrinkable films and pipewraps. Accordingly, the selection of these materials per se comprises no part of the present invention.

By way of illustration, however, the polyolefinic materials which may be employed are in general characterized as being heat shrinkable (or heat recoverable, as they are sometimes referred to in the art) materials having the properties of elastic memory imparted to them by the crosslinking and orientation. The preferred materials are the polyethylenes, e.g. low density polyethylene (LDPE), medium density polyethylene (MDPE), high density polyethylene (HDPE), very low or ultra low density polyethylene (VLDPE), and linear low density polyethylene (LLDPE), including blends thereof.

As examples of other useful polymers which may be used alone or in combination with polyethylene, mention may be made of ethylene vinyl acetate copolymers, ethylene propylene rubber, EPDM, polypropylene, polyvinyl chloride, polyisobutylene, conjugated diene butyl, butyl rubber, etc.

The polyolefinic materials may, if desired, be blended to form a mixture of polymers along with other reagents performing specific desired functions for the film, e.g. a colorant such as carbon black, an antioxidant, ultra-violet stabilizers, fillers, crosslinkers, anti-blocking agents, etc. In general, useful materials for a shrink wrap sheet are typically composed of a semicrystalline crosslinkable polymer such as polyolefin (i.e. polyethylene, polypropylene, and copolymers of ethylene with vinyl unsaturated moieties such as vinyl acetate, acrylic acid, methylacrylate, ethyl acrylate, etc.), polyester (i.e. polyethylene terephalate), polyamides (e.g. nylon) preferably stabilized against oxidative degradation.

Blends of a non-crystalline polymer (e.g. neoprene, ethylene propylene rubber, choriated polyethylene) with a semicrystalline polymer are also useful. In addition, noncrystalline polymers with a high Tg (e.g. polyvinyl choride) are suitable as well. In the case of polyethylene and other polymers which are radiation crosslinkable without significant degradation, or polymers such as polyvinyl chloride and polypropylene which can be made so by the addition of suitable pro-rad, electron beam crosslinking is highly desirable for sheet processing.

Preferably, however, the heat shrinkable film 16 should be of the same material as the shrinkwrap with which it is to be employed.

The composition of the shrink sleeve (and closure) determines the temperature at which significant shrinking takes place (i.e. the crystalline melting point or Tg of the composition). The degree of crosslinking imparted to the shrink wrap backing and the amount of orientation control the amount of shrink recovery of which the sheet is capable and the recovery force which the sheet will exert on the overlap closure when the sheet is shrunk over a constraining cylinderical body such as a pipe with the pipe and closure system acting as a constraint against reaching the maximum shrinkage.

Backing layer 12 of the closure should be of a composition able to resist the heat and flame of a torch for a time sufficient to allow the underlying plastic tab to melt and fuse to the backing of the shrink wrap. Materials which have been found suitable are polyimide film (i.e. "Kapton", trademark of Dupont) and aluminum foil. Other materials which could be used are Kevlar fabric, fiberglass fabric, laminate of fiberglass fabric with aluminum foil, flame-resistant cotton, etc.

In like manner, the particular adhesives employed may be selected from those heretofore employed with heat shrinkable films namely, crosslinked, high temperature resistant, shear resistant, flame resistant pressure sensitive adhesives. The preferred pressure sensitive adhesive is a silicone based adhesive.

Since the adhesive which may be utilized in the practice of this invention may be of the type per se known and used in the adhesive tape art, e.g. the protective pipe wrap art, the selection of the particular adhesive may be considered to be a matter of individual choice or mere whim and per se comprises no part of this invention. In like manner, the particular adhesive thickness as well as the manner of application to the heat shrinkable film will be a matter of choice within the expected judgment of the skilled worker.

By way of illustration and not limitation, film 16 may be on the order of 10–30 mils thick. The adhesive coating 14 may be 0.5–3 mils thick and backing layer 12 may be on the order of 0.5–5 mils thick.

EXAMPLE 1

A film approximately 20 mils (0.020|) thick was made by calendering a composition comprising:

| Material | Parts by Weight |
| --- | --- |
| Low Density Polyethylene (Melt Index 2.0, density 0.920 g/cc) | 62.10 |
| Ethylene/Vinyl Acetate Copolymer (17% by weight Vinyl Acetate; Melt Index 1.8, density 0.937 g/cc) | 35.00 |
| "Agerite" Resin D (Vanderbilt), a polymerized dihydroquinoline antioxidant | 1.50 |
| Carbon Black | 1.25 |

The film was irradiated on an Electrocurtain ® electron beam processor (E.S.I. Woburn, Mass.). Irradiation was bilateral at 215 k volts to a total surface dose of 20 Mrad on both sides. Under such conditions, the dose throughout the thickness of the sheet is calculated from standard depth dose curves to be substantially uniform.

The above heatshrinkable sheet was cut into rectangles 3½| wide by 18| long. In the practice of this invention, the length of the plastic sheet should be substantially identical to the width of the shrink wrap it is to be used with. The width can range from 1| to 10%.

EXAMPLE 2

A pressure sensitive tape was made by coating a two mil thick film of "Kapton" (Dupont trademark for polyimide) with a silicone adhesive. The adhesive was Dow Corning Q2-7406, crosslinked with 2 phr (based on solids) of benzoyl peroxide. The adhesive was crosslinked by subjecting it to a temperature of 210° C. (410° F.) for 80 seconds after the solvent was removed. The "Kapton" film was previously primed with a polydimethylsiloxane prime coat for good anchorage [a practice which is common and well known in the art of applying silicone based pressure sensitive adhesives to plastic films.] The resulting adhesive was 1.6 mils thick and well anchored.

The peel force of this tape from the polyolefinn film of above composition was determined to be 40 ozs.-/inch width. The shear holding power was determined to be less than ⅛| movement at 500° F. (260° C.) under a shear stress of 50 grams/inch2 (mil spec I23594).

The tape was cut into rectangles 5½| wide by 20| long, so as to overlap the polyolefin rectangles by 1| on all sides.

EXAMPLE 3

The tape rectangles as prepared in Example 2 were adhered to the polyolefin rectangles of Example 1 with approximately 1| of the PSA tape extending on all sides of the polyolefin rectangles. The PSA on the Kapton/silicone tape was protected from contamination during storage and transport by adhering it to an appropriate release film, an example of which is embossed rigid PVC film such as those made by 4P Folie Forchheim of Germany. For non-silicone crosslinked PSA's, dimethylsiloxane release treated films and papers would be appropriate.

A heat-shrinkable tape having a shrinkability of 35% was made of substantially the same composition of polyethylene and ethylene vinyl acetate copolymer as the shrinkable film prepared in Example 1. The backing material was 29 mils thick after stretching and was coated with 55 mils of a butyl based mastic adhesive. The sleeve, which was 18| wide and 32.5| long in the shrink direction, was wrapped over the weld joining two pieces of pipe approximately 8.625| in diameter, leaving an overlap of approximately 3| to 4|.

The release film was removed from the closure as prepared in Example 3, and the closure was then applied to the overlap such that the plastic tab was equally divided between the underlayer and overlayer of the shrink wrap at the overlap. The Kapton silicone tape was pressed down to hold the plastic tabbing patch in place.

A liquid propane (LP) gas torch (exact 3151) was connected to a regulated supply of LP gas and the flame adjusted to about ¼ full flow at 30 psi. The flame was applied directly back and forth to the polyimidesilicone tape until the underlying heat-shrinkable film began to melt. At this point, the whole closure is pressed down on the underlying sleeve with a gloved hand, and heat and pressure are applied alternatively until the heat-shrinkable film and the underlying shrink wrap backing are fused together leaving a flat patch which is substantially integral with the backing of the shrink sleeve. After the closure device has fused, the rest of the wrap is shrunk onto the pipe in the normal manner. No special care need be taken to avoid reheating the overlap area since the tensile strength of the heat-shrinkable film at the application temperature is substantially that of the shrink sleeve backing itself. There is no adhesive to deform or shear at the application temperature. After the whole wrap and pipe have cooled to ambient temperature, the Kapton silicone tape is removed and discarded. When an attempt was made to remove the heat-shrinkable film from the shrink sleeve, it was found that the film will break at over 28 lbs./inch before it will peel from the backing of the shrink sleeve. Thus, the bond between the heat-shrinkable film and the shrink sleeve backing exceeds the tensile strength of the material in each, i.e. the heat-shrinkable film and the shrink sleeve backing have become substantially integral with each other.

The following table presents test data obtained for the aforementioned example.

TABLE

| Heat Resistance | |
|---|---|
| Shrink temperature | 200–225° F. |
| Application temperature | 250–350° F. |
| Decomposition temperature | 450° F. |
| Flame Resistance | |
| Did not ignite. Self extinguished at end of 15 seconds; flame application repeated three times. | |

Dimensional Stability of Closure

No shrinkage after 10 minutes of heating at 350° F.

Adhesion 1. Adhesion of polyimide silicone layer to shrink sleeve. 32–40 ozs./inch before heating. 64–80 ozs./inch after heating at 350° F. for 10 minutes. 2. Adhesion of shrink wrap layer in closure to underlying shrink sleeve. Peel strength greater than tensile strength i.e. greater than 25 lbs./inch. 3. Adhesion of fused closure and shrink sleeve to steel greater than 15 lbs./inch at 70° F.

From the foregoing description, example and data, it can be seen that the present invention provides for an elegant closure mechanism for shrink wraps.

More specifically, the present invention provides for a heat resistant, flame resistant and dimensionally stable shrink wrap closure that allows for maximum fusion between closure/shrinksleeve and pipe without the accompanying dimensional distortion noted with the prior art adhesive closure mechanisms.

Since certain changes may be made without deputing from the scope of the invention herein involved, it is intended that all matter described in the foregoing specification, including the example, shall be interpreted as illustrative and not in a limiting sense.

What is claimed is:

1. A closure device comprising:
   (a) a high temperature-resistant, flame-resistant and dimensionally stable backing layer;
   (b) a crosslinked, high temperature-resistant, shear-resistant, and flame-resistant pressure sensitive adhesive applied to one surface of said backing layer; and
   (c) a heat-shrinkable film dimensionally smaller than said pressure sensitive adhesive layer applied to said pressure sensitive adhesive layer so as to remain a peripheral area of exposed pressure sensitive adhesive.

2. The closure device described in claim 1, further comprising a release sheet dimensionally larger than said backing layer and applied to cover the exposed adhesive containing areas.

3. The closure device described in claim 1, wherein the heat-shrinkable film is a polyolefin.

4. The closure device described in claim 3, wherein said polyolefin is polyethylene.

5. The closure device described in claim 1, wherein said backing layer is selected from the group of high temperature-resistant materials consisting of polyimide aluminum foil, Kevlar fabric, fiberglass fabric, laminates of fiberglass fabric with aluminum foil, and flame-resistant cotton.

6. The closure device described in claim 5, wherein said backing layer is polyimide.

7. The closure device described in claim 1, wherein the pressure-sensitive adhesive is a silicone-based adhesive.

8. A closure device comprising
   (a) a polyimide backing layer;
   (b) a silicone based adhesive applied to one surface of said backing layer; and
   (c) a polyolefinic heat-shrinkable film dimensionally smaller that said silicone adhesive layer, applied to said adhesive layer so as to maintain a peripheral area of exposed silicone adhesive.

9. A closure device comprising:
   (a) a 0.5–5 mil thick high temperature resistant, flame-resistant and dimensionally stable backing layer;
   (b) a 0.5–3 mil thick crosslinked, high temperature-resistant, shear-resistant, and flame-resistant pressure sensitive adhesive applied to one surface of said backing layer; and
   (c) a 10–30 mil thick heat-shrinkable film dimensionally smaller than said pressure sensitive adhesive layer applied to said pressure sensitive adhesive layer so as to maintain a peripheral area of exposed pressure sensitive adhesive.

* * * * *